United States Patent
Attia

[19]
[11] Patent Number: 6,080,281
[45] Date of Patent: Jun. 27, 2000

[54] SCRUBBING OF CONTAMINANTS FROM CONTAMINATED AIR STREAMS WITH AEROGEL MATERIALS WITH OPTIONAL PHOTOCATALYTIC DESTRUCTION

[76] Inventor: Yosry A. Attia, 221 Oakland Park Ave., Columbus, Ohio 43214

[21] Appl. No.: 08/569,709

[22] Filed: Dec. 8, 1995

Related U.S. Application Data

[63] Continuation-in-part of application No. 08/229,456, Apr. 18, 1994, abandoned.

[51] Int. Cl.[7] .............................. B01D 53/02; B01D 53/86
[52] U.S. Cl. .............................. 204/157.3; 95/90; 95/129; 423/210; 423/245.3; 423/239.1
[58] Field of Search .................................... 502/405, 236, 502/237, 239, 251, 340, 242; 423/230, 239.1, 635, 210, 245.1, 245.3; 204/157.3; 588/212, 227; 95/90, 129

[56] References Cited

U.S. PATENT DOCUMENTS

| | | | |
|---|---|---|---|
| 3,781,194 | 12/1973 | Teichner et al. | 204/157.93 |
| 4,552,683 | 11/1985 | Powell et al. | 423/635 |
| 4,886,769 | 12/1989 | Kuma et al. | 502/62 |
| 4,966,665 | 10/1990 | Ibuskuki et al. | 204/157.3 |
| 5,045,288 | 9/1991 | Raupp et al. | 204/157.3 |

FOREIGN PATENT DOCUMENTS

| | | | |
|---|---|---|---|
| 3937863 | 6/1990 | Germany . | |
| 4103280 | 8/1992 | Germany | 502/405 |
| 3-094814 | 4/1991 | Japan . | |
| 1149858 | 4/1969 | United Kingdom | 423/405 |

OTHER PUBLICATIONS

Koper, O., et al. "Destructuve Adsorption of Chlorinated Hydrocarbons on Ultrafine . . . Calcium Oxide", Chemistry of Materials, vol. 5, #4 (1993), pp. 500–505.

Gesser, H., et al. "Aerogels and Related Porous Materials," Chemical Reviews, (1959), vol. 89, #4, pp. 765–789.

Formenti, M., et al. Bulletin of the Chem. Soc. France, (1972), pp. 69–76.

Primary Examiner—Steven P. Griffin
Assistant Examiner—Peter DiMauro
Attorney, Agent, or Firm—Mueller and Smith LPA

[57] ABSTRACT

Disclosed is a method for separating a vaporous or gaseous contaminant from an air stream contaminated therewith. This method includes the steps of: (a) passing said contaminated air into a contact zone in which is disposed an aerogel material capable of selecting adsorbing said contaminant from air and therein contacting said contaminated air with an aerogel material; and (b) withdrawing from said zone, air depleted of said contaminant. For present purposes, "contaminant" means a material not naturally occurring in ambient air and/or a material naturally occurring in air but present at a concentration above that found in ambient air. Thus, the present invention scrubs (or treats) air for the purpose of returning it to its ambient composition. Also disclosed herein is a process for the photocatalytic destruction of contaminants from an air stream wherein the contaminated air stream is passed into a control cell or contact zone in which is disposed a photocatalytic aerogel and exposing said aerogel to ultraviolet (UV) radiation for photocatalytically destroying the adsorbed contaminant, and withdrawing from said cell an exhaust air stream depleted in said contaminant.

19 Claims, 1 Drawing Sheet

SCRUBBING OF CONTAMINANTS FROM CONTAMINATED AIR STREAMS WITH AEROGEL MATERIALS WITH OPTIONAL PHOTOCATALYTIC DESTRUCTION

CROSS-REFERENCE TO RELATED APPLICATIONS

This application is a continuation-in-part of application Ser. No. 08/229,456, filed Apr. 18, 1994, now abandoned, this disclosure of which is expressly incorporated herein by reference.

BACKGROUND OF THE INVENTION

This invention, in part, was made with Government support under Grant No. DE FG51-92R020214, awarded by the United States Department of Energy. The Government may have certain rights in this invention.

Despite technical progress in reducing air pollution in recent decades, the environment still suffers from poor air quality. Many sources contribute to overall air pollution, for example, fossil fuel combustion in stationary systems (e.g. diesel powered generators, electric power plants; cement, ceramic, chemical and other manufacturing plants) and mobile systems (e.g. diesel trucks, buses, automobiles, air planes), gasoline marketing operations, industrial coatings, and solvent usage. Since air pollution leads to a variety of serious health and environmental problems, innovative and cost-effective approaches are needed to prevent and control the emissions of gaseous effluents such as nitrogen oxides ($NO_X$), sulfur dioxide ($SO_2$), volatile organic compounds (VOC's), carbon monoxide (CO), and hydrogen sulfide ($H_2S$) from stationary and mobile sources into the atmosphere.

$NO_X$ controls have concentrated with varying degrees of success on combustion modifications and on selective catalytic reduction using ammonia. However, the latter controls addresses only stationary sources and leaves mobile sources which contribute the greater share of $NO_X$ emissions unresolved. Automobile catalytic exhaust systems containing Palladium/Platinum (Pd/Pt) and Rhodium (Rh) under ideal conditions effect the oxidation of VOC's and CO as well as $NO_X$ reduction. Unfortunately, these catalysts are not designed to resist poisoning by many organic compounds, particularly those containing chlorine and sulfur. Thus many problems associated with CO, VOC's and $NO_X$ emissions still exist.

The utilization of fossil fuels (coal, oil, and gas) is faced with an imminent threat, unless feasible methods are developed to reduce the emissions of $CO_2$, CO, $SO_2$ and $NO_X$, which are produced by the combustion of fossil fuel. These gases are blamed for environmental problems, such as, for example, acid rain, global warming, and increased toxicity of breathing air. In the absence of a viable technology for reducing the emission of these gases into the atmosphere, alternative energy sources, such as solar, nuclear, and wind, will either displace or severely affect fossil fuels. This may result in wasting vast energy resources due to the inability to utilize them in an environmentally acceptable way.

The currently available commercial technology for reducing $SO_2$ and $NO_X$ emissions from power plants is wet scrubbing. However, since this technology is costly and creates hazardous slurry wastes, it has not found wide acceptance by the power utilities. Dry sorbent injection technologies seem to be more promising; however, they too produce dry hazardous wastes. The dry sorbents are injected into a conventional power plant either in the combustion furnace (1204° C.), the economizer zone (538° C.), or the "cool side" ducts (70° C.). Typical sorbents include finely ground limestone, dolomite, hydrated lime, sodium bicarbonate, and sodium sesquicarbonate. The sorbents react with $SO_2$ emissions to form solid products, such as $CaSO_4$ or $Na_2SO_4$, which are then removed with the coal ash or with the dust by the particulate collection system, e.g., electrostatic precipitator or baghouse, depending on the point of injection. The potential problems with the above mentioned dry sorbents are inefficient sorbent utilization and formation of hazardous wastes. To increase utilization rate of the sorbent, finer particle size is used. However, finer particles are more easily carried out of the reaction bed by the flue gas and as a consequence, their reaction time is shortened leading to incomplete reaction and inefficient utilization of the sorbent.

In an article by P. V. Smith entitled "Economics of Sorbent Injection for Coal Fired Boiler Acid Gas Control", in *Processing and Utilization of High Sulfur Coals, IV*, Elsevier, Amsterdam, p. 791, 1991, which article is incorporated herein by reference in its entirety herein, there is provided an excellent overview of the dry sorbent injection techniques. According to the Smith article, four general approaches have been extensively investigated, and are currently at varying levels of development and commercial availability. These are: (a) injection of limestone or hydrated lime sorbents in a 2200° F. (1204° C.) zone; (b) economizer injection of calcium hydrate (hydrated lime sorbent) in a 1000° F. (538° C.) zone; (c) low temperature duct injection of calcium hydrate at high relative humidity at 160° F. (71° C.); and (d) low temperature duct injection of sodium based sorbents at 250–350° F. (121–177° C.).

With injection inside the combustion furnace, the sorbents which have been investigated to date are naturally occurring limestone/dolomite or their hydrated derivatives. When these sorbents are injected as a fine dry powder into the furnace, they undergo the following two step reaction:

The calcite components of dolomites or hydrated dolomites undergo the same reactions. Thermodynamically, $CaSO_4$ is not stable at temperatures of 2300° F. (1260° C.) in an environment typical of high sulfur coal-fired combustion products, i.e., 2000–4000 parts per million (ppm) of $SO_2$. However, the lower temperature limit for the formation of $CaSO_4$ depends on complex interactions between sulfonation kinetics, crystal growth, sintering, and the build up of a barrier product layer of $CaSO_4$ on the surface of the reactive CaO.

The injection of the sorbents outside the combustion furnace at 1000° F. (538° C.) gave a similar capture rate to injection inside the furnace with commercial hydrates, and a significantly better performance with specially prepared sorbents (only hydrates). Injection at these moderate temperatures may not only result in higher sorbent utilization, but also facilitates injection due to the small cross section (denser, higher velocity gas), and the ability to insert injection grids. At these temperatures, $SO_2$ appears to react very rapidly and directly with $Ca(OH)_2$ according to the following reaction;

$$Ca(OH)_2 + SO_2 \rightarrow CaSO_3 + H_2O(g)$$

The formation of sulfite however, has to compete with the following reaction between abundant $CO_2$ and $Ca(OH)_2$ to form $CaCO_3$;

$$Ca(OH)_2 + CO_2 \rightarrow CaCO_3 + H_2O(g)$$

It follows that below 1000° F. (538° C.), both sulfite and carbonate occur, but sulfite formation dominates; and above 1000° F. (538° C.), dehydration of $Ca(OH)_2$ accelerates with carbonation and the dehydration occurs at the expense of sulfite formation.

However, finer particles are more easily carried out of the bed by the flue gas. As a consequence, their reaction time is shortened leading to incomplete reaction and inefficient utilization of the sorbent. To solve this problem, a method of agglomerating fine limestone particles with some adhesive substances, has been developed and used in China as described in the Zhijiang article. This is called synthetic Ca-based sulfur sorbent with high reactivity.

For natural limestone, reactant gases diffuse into the inside particles only through the small pores among CaO grains. In the process of diffusion, $SO_2$ and $O_2$ react with

TABLE 1

Typical Calcium-Based Sorbent Properties
(adapted from Smith article)

| Type | Formula | Ca (wt %) | Mg (wt %) | Particle Size ($\mu$m) | Surface Area ($m^2/g$) | $SO_2$ Removal (%) |
|---|---|---|---|---|---|---|
| Limestone | $CaCO_3$ | 37–40 | 0.4–0.5 | 7.0–13[a] | 1.0–6.0[b] | 25–40 |
| Dolomite | $CaCO_3 \cdot MgCO_3$ | 21–25 | 11–12 | 12–37[a] | 0.5–1.0[b] | 40–60 |
| High Calcium Hydrate | $Ca(OH)_3$ | 48–52 | 0.2–1.4 | 2.0–4.0 | 12–21 | 40–60 |
| Atmospheric hydrated dolomite (monohydrated) | $Ca(OH)_2 \cdot MgO$ | 28–30 | 18–19 | 14–20 | 10–21 | 60–80 |
| Pressure hydrated dolomite (dihydrate) | $Ca(OH)_2 \cdot (MgO)_2$ | 29–30 | 16–18 | 1.0–4.0 | 19–20 | 60–80 |

[a]Typical grind (size) range tested to date.
[b]Limestone and dolomite also vary in grain structure, which has greater impact on sorbent utilization than raw surface areas.
[c]Inlet $SO_2$ = 2500 ppm, Ca/S = 2.

Among the important parameters influencing the $SO_2$ removal efficiency by all methods of sorbent injection are sorbent type, surface area, and injection temperature. The amount of sorbent required for a given removal level depends on the concentration of $SO_2$ gas and the sorbent efficiency which is strongly determined by the surface area and porosity. Table 1 lists typical physical and chemical properties of the various commercially available sorbents. From Table I, the particle size of the sorbent powder ranges from 1–37 microns, while the surface area ranges between 1 to 20 square meter per gram ($m^2/g$).

An important conclusion from the previously cited study is that further improvements with commercially available sorbent materials has reached a limit, and no large increases are anticipated with further work. Thus, new sorbents and processes are needed for enhancing $SO_2$ removal. The improved $SO_2$ removal is expected to depend on the porosity of the sorbent, which in turn is related to its specific surface area.

As mentioned earlier, $SO_2$ can be removed from the flue gases by adding calcium-based sorbent according to the following chemical reaction:

$$CaO + SO_2 + 0.5 O_2 \rightarrow CaSO_4$$

Electron microscope examination, as described in the article by Zhijiang, et al., entitled "Research on the Effect of Pore Size Distribution of Sulfur Sorbent on the Performance of Sulfur Capture", published in *Processing and Utilization of High Sulfur Coals, IV*, Elsevier, Amsterdam, p.731, 1991, showed that this reaction takes place only within a thin layer on the outer surface of the sorbent particles. Thus, the finer the particle, the higher the utilization rate of the sorbent.

CaO grains to produce solid $CaSO_4$ which then covers the surface of CaO grains. In a short time, these small pores are filled and the diffusion of reactant gases into the particles is limited. The resulting overall CaO conversion rate of natural limestone particles is very low. However, with synthetic sorbents which are prepared by agglomerating small particles of limestone with a binder, reactant gases ($SO_2$ and $O_2$) not only directly diffuse into grain groups near the surface, but also directly penetrate to internal groups through the large pores between the grain groups. This is beneficial for increasing the overall CaO conversion rate.

Activated carbon (coke) has been used, in Germany as described in an article by E. Beier entitled "Entschweflungs-verfahren Für Kohlengefeuerte Kraftwerke, Gluckauf-Porschungshefte", 42, p.3–8, 1981 and in an article by E. Richter et al. entitled "Methods using Activated Coke for the Removal of $SO_2$ and $NO_x$ from the Flue Gases of Firing Systems", published in *Processing and Utilization of High Sulfur Coals*, Elsevier, Amsterdam, p.563, 1985, to adsorb $SO_2$ from the hot flue gases in the presence of $O_2$ and $H_2O$ vapor according to the following reaction:

$$2SO_2 + O_2 + 2H_2O(vap) \rightarrow H_2SO_4$$

Sulfuric acid ($H_2SO_4$) is later desorbed (released) from the activated carbon by heating with hot sand according to the following reaction:

$$2H_2SO_4 + C \rightarrow 2H_2O + CO_2 + 2SO_2$$

The degree of desulfurization achieved by this method has not been reported. Activated carbon is expected to capture gases by a physical adsorption mechanism as there are no chemisorption mechanisms available.

Colmenares (U.S. Pat. No. 5,030,607) teaches that an aerogel of titania and silica is expected to photocatalyze reactions under sunlight, as is an aerogel of silica and uranyl ions (or uranium oxide aerogel $UO_2$). The silica aerogel is transparent and, thus, enables more efficient irradiation of the photoactive sites (e.g., $TiO_2$ or $UO_2$ aerogel). To achieve such aerogel photocatalysts, Colmenares teaches doping the silica aerogel with 0.1–0.5% mol. wt. of photocatalyst (e.g., $TiO_2$, $UO_2$). The present invention, on the other hand, teaches a preferred content of photocatalyst aerogel component (e.g., $TiO_2$, etc.) in the total aerogel ranges between about 20%–80% mol. wt.

Following Colmenares' teaching will yield impractical industrial products for the scope of air pollution control addressed by the present invention. For example, if a reactor loading of 1 gram of $TiO_2$ photocatalyst per liter of fluid is desired, 1 gram of pure $TiO_2$ aerogel or powder would be used, while according to the instant invention, about 1.3 grams of 1:3 silica-titania (75% $TiO_2$), 2 grams of 1:1 silica-titania, and 4 grams of 3:1 silica-titania (25% $TiO_2$) would be required. On the other hand, to achieve the 1 gram $TiO_2$ loading using aerogel according to Colmenares, 200–1,000 grams would be needed. Such amounts will unnecessarily fill a large volume of reactor's capacity with inert materials which makes the process impractical and uneconomic. While with the instant invention, the advantages described earlier still outweigh the slight increase in inert silica volume in the photocatalysis reactor. Also, Colmenares' patent does not teach the advantage of having inert aerogel matrix (which might also be opaque) for reducing blockage of photoactive surface sites by adsorbing reaction products, as taught herein.

Matsushita (Japanese patent 03-094,814) coats alumina-silica aerogel with titania ($TiO_2$) photocatalyst particles and uses it to remove air pollutants from indoor air under ultraviolet irradiation. However, the titania coating is not an aerogel material and, while it represents significant improvements over titania particles (powder) not supported on aerogel, it is not expected to be as efficient as titania aerogel, or titania-silica aerogel because of the higher surface area of the fitania aerogel and the other two advantages described herein.

Teichner, et al. (S. J. Teichner, G. A. Nicolan, M. A. Vicarini, and G. E. E. Gardes, *Adv. Colloid Interface Sci.*, 5 (1976) 245), prepared titania ($TiO_2$) aerogels and used it to photocatalyze the partial oxidation of paraffins, olefins, and alcohols into ketones and aldehydes. However, these aerogels had a relatively low surface area of about 120 $m^2/g$. Geula Dagan and Micha Tomkiewicz (*J. Non-Crystalline Solids*, 175 (1994) 294–302; and *J. Physical Chemistry*, Vol. 97, No. 49, December 1993), prepared titania ($TiO_2$) aerogels having a surface area of 600 $m^2/g$ and 90% porosity, which they used to photocatalyze the oxidation of salicylic acid under UV illumination. Thus, the latter study shows that high surface area titania aerogel can be obtained without having to mix it with other higher surface area aerogels such as $SiO_2$ or MgO.

However, these studies by Teichner, et al., and Dagan & Tomkiewicz, do not teach the advantages of having the photoactive aerogel components (e.g., $TiO_2$, ZnO, etc.) uniformly dispersed in an inert aerogel matrix, such as silica, as described herein.

SUMMARY OF THE INVENTION

Disclosed is a method for separating a vaporous or gaseous contaminant from an air stream contaminated therewith. This method includes the steps of: (a) passing said contaminated air into a contact zone in which is disposed an aerogel material capable of selecting adsorbing said contaminant from air and therein contacting said contaminated air with an aerogel material; and (b) withdrawing from said zone, air depleted of said contaminant. For present purposes, "contaminant" means a material not naturally occurring in ambient air and/or a material naturally occurring in air but present at a concentration above that found in ambient air. Thus, the present invention scrubs (or treats) air for the purpose of returning it to its ambient composition.

Often, these contaminants are termed "pollutants", i.e., a harmful chemical or waste material discharged into the water or atmosphere; something that pollutes (Webster's New World Dictionary of the American Language, 2nd College Edition, D. B. Guralinik, editor-in-chief, William Collins & World Publishing Co., Inc., 1974). Often, the term "acid gas" or "acid rain" or "acid deposition" is used to apply to these contaminants,

[a] complex chemical and atmospheric phenomenon that occurs when emissions of sulfur and nitrogen compounds are transformed by chemical processes in the atmosphere, often far from the original sources, and then deposited on earth in either wet or dry form. The wet forms, popularly called 'acid rain', can fall as rain, snow, or fog. The dry forms are acidic gases or particulates.

Terms of Environment, EPA doc. #:175/B-093-001.

Thus, gaseous and vaporous wastes, such as $CO_2$, $SO_2$, $NO_x$, $H_2S$, CO; and VOC's, such as benzene, formaldehyde, acetone, toluene, methylene chloride, and the like are "contaminants" advantageously treated in accordance with the precepts of the present invention. However, it must recognized that "contaminants" may be beneficial gases or vapors not naturally occurring in ambient air and which can be scrubbed or sorbed for their separation of an air stream by the aerogels disclosed herein.

Also disclosed herein is a process for the photocatalytic destruction of contaminants from an air stream wherein the contaminated air stream is passed into a control cell or contact zone in which is disposed a photocatalytic aerogel and exposing said aerogel to ultraviolet (UV) radiation for photocatalytically destroying the adsorbed contaminant, and withdrawing from said cell an exhaust air stream depleted in said contaminant.

The photocatalytic aerogels disclosed involve incorporating an active photocatalytic semi-conductor, such as $TiO_2$, ZnO, $WO_3$, etc., in a an inert (non-photoactive) matrix such as silica ($SiO_2$). Both the semi-conductor and inert matrix are in aerogel form. The preferred inert matrix is also transparent or translucent to light, particularly to UV light. Both the photoactive semiconductor and the inert matrix are intimately mixed and uniformly inter-dispersed aerogel components as their precursors have been intimately mixed at the molecular level during the preparation of the wet gel (alco or hydro) by the sol-gel processing, which is followed by supercritical extraction of the liquid to form dry aerogel. The advantages of having the photoactive semi-conductor aerogel dispersed in an inert aerogel matrix are: (1) A transparent/translucent inert aerogel matrix will enable more efficient irradiation of all the photoactive semi-conductor locations leading to efficient utilization of light energy and the semi-conductor high surface area. (2) The inert aerogel matrix, whether transparent or opaque, provides additional space so that surface reaction products/intermediates that might be adsorbed on (or slowly desorbing from) one photoactive site, do not block access to other photoactive sites, as would be the case in the absence of such inert sites.

Such blockage would slow down the kinetics or inhibit the photocatalytic reactions. Thus, the presence of inert aerogel matrix sites is expected to further improve the efficiency of the photoactive semi-conductor aerogel.

The preferred molar ratio/content of photoactive semi-conductor aerogel (e.g., $TiO_2$) to inert matrix aerogel (e.g., silica) in the novel photocatalytic aerogel, ranges between 1:4 and 4:1, (i.e., 20% and 80% mol. wt. of total aerogel). Silica-titania aerogels prepared in accordance with the precepts of the present invention, have been characterized to have between 550–770 $m^2/g$, for 1:1, 2:1, and 3:1 $SiO_2$:$TiO_2$ aerogels Thus, disclosed is the preferred use of a mixture of active and inert aerogel materials for formning a composite aerogel material that is superior in its ability to scrub contaminants from contaminated air streams.

Advantages of the present invention is the ability to efficiently and efficaciously scrub contaminants from air streams. Another advantage is the use of an adsorbent that can adsorb many times its own weight in contaminants; yet, can readily be reactivated for reuse. A further advantage is the ability to photocatalytically destroy contaminants adsorbed by photocatalytic aerogels in the presence of UV radiation. These and other advantages will be readily apparent to those skilled the art based on the disclosure contained herein.

BRIEF DESCRIPTION OF THE DRAWINGS

The structure, operation, and advantages of the presently preferred embodiment of the invention will become further apparent upon consideration of the following description taken in conjunction with the accompanying drawings, wherein.

DETAILED DESCRIPTION OF THE INVENTION

The present invention is directed to the use of advanced specialized aerogel materials for the capture of gaseous and vaporous wastes, such as $CO_2$, $SO_2$, $NO_X$, $H_2S$, CO; and VOC's, such as benzene, formaldehyde, acetone, toluene, and methylene chloride, typically produced from the utilization of fossil fuels and a variety of industrial and commercial activities. The aerogel materials of the invention typically have over 90% porosity, very low density in the range of about 0.04 g/cc to about 1.0 g/cc, extremely high surface area of about (20 $m^2/g$–1600 $m^2/g$) compared with dry sorbent powder (1–20 $m^2/g$), and can be prepared in the appropriate chemical composition to capture (separate) the gaseous species in question. Because of these properties, these aerogels can capture (sorb) several times their weight of the gaseous effluents. When the effluents are captured or adsorbed, the gels can be re-generated for further re-use and the gases may be further separated, processed, and/or utilized. Alternatively, gas-gel reaction products will lead to the formation of materials which are suitable for use as, for example, fertilizers or building materials.

The application of the aerogel sorbents, in accordance with the invention, is on substantially particulate-free gases (i.e., ash, dust, and smoke particulates advantageously are filtered out initially) and, thus, the dry solid aerogel gas products will not, in most cases, constitute hazardous waste materials, but commercially re-usable products. For example, in a power plant application, the aerogel sorbent will be placed after the particulate control system (ESP or baghouse), and in an automobile application, a regular smoke filter will precede the aerogel gas filter and both will be attached to the tail exhaust pipe.

The high surface area (high porosity) aerogels of the present invention will be able to capture the greenhouse gases ($CO_2$, $SO_2$, $NO_X$, CO) through both physical and chemical sorption mechanisms as these aerogel materials will contain components such as CaO and MgO in their structure. Reactions between the greenhouse gases and the components are well known and will form products such as $CaSO_4$, $CaCO_3$, $MgCO_3$, and $Ca(NO_3)_2$. These reactions (as well as physisorption) may be reversed at higher temperatures to dissociate these compounds thus re-generating the CaO and MgO components of the aerogel and release these gases in a controlled manner for subsequent utilization. For example, $SO_2$ may be used to produce sulfuric acid, and the $CO_2$ may be condensed and used commercially.

It is important to note that the chemical composition, surface area, porosity, shape, size, and physical strength of the disclosed aerogels can be customized for the particular application. The aerogel filters will have the ability for continuous re-use after re-generation cycles either on site or in regeneration plants. However, if it is more economically viable to utilize the reacted aerogels, for example as fertilizers or building materials, then regeneration will not be necessary.

An important aspect of the invention relates to the preparation of the aerogel compositions which take advantage of the obvious benefits of having porous agglomerates of the calcium based sorbents, porous activated carbon, and/or other metallic oxides in their structure to increase the efficiency of green house gas, acid gas, and VOC's capture and reactivity. These benefits are far superior to either prior art calcium based powders or agglomerates, or activated carbon, due to the aerogel's extremely high porosity, high surface area, and the presence of metallic oxides. Also, the aerogel can be molded to any monolithic shape and size, or ground into granules, particles, or powder of any desired size and is thus more adaptable to different applications than the prior art powder or agglomerate. In this regard, the data reported herein will demonstrate that use of a mixture of active (active for scrubbing the contaminant of interest) and inert (inactive for scrubbing the contaminant of interest) ingredients in forming a composite aerogel material will result in superior scrubbing capability compared to use of an all active aerogel material. Without being bound by theory, it is believed that when using the all active aerogel material the pores become clogged due to the aerogel material's ability to efficienfly adsorb the contaminant from the contaminated air stream contacted therewith. The aerogel pores, then, become clogged which seals off the interior pores from further scrubbing activity. Use of a mixture of active and inactive aerogel material, however, lessens such pore clogging which opens the interior porosity of the composite aerogel material or the active sites therein to be available for scrubbing. Thus, increased contaminant scrubbing is achieved.

"Aerogels" are a class of materials reported by Kistler in U.S. Pat. No. 2,093,454 wherein highly porous gels are produced. Production of silica aerogels has been developed and discussed in U.S. Pat. Nos. 2,039,454, 2,188,007 and 2,249,767, as well as in articles by Fricke, "Aerogels", *Springer-Verlag*, 1986, Mulder and Van Lierop, 1986, "Preparation, Densification, and Characterization of Autoclave Dried $SiO_2$ Gels, Aerogels", *Springer-Verlag*, p. 68, 1986, and Teichner et al., *Adv. Coll. Interf. Sci.*, 5, 245, 1976. It is well known that the texture and mechanical properties of the produced aerogels are influenced by several parameters. Composition, pH, temperature, and the aging period are the most important parameters which effect gelation. However, hypercritical evacuation in an autoclave, to produce highly porous monolithic aerogels is mainly affected by pressure, temperature, and the rate of heating and cooling.

Aerogel materials are made by the sol-gel process and supercritical drying. The preparation of the wet alcogel involves dissolving/mixing the metal alkoxides and other chemical precursors in alcohol at the desired temperature and molar ratios. Water is then added at the fixed molar ratio to effect hydrolysis of the alcohol (e.g., ethanol, $C_2H_5OH$) solution of a metal alkoxide (e.g., magnesium ethoxide, $Mg(OC_2H_5)_2$) is hydrolyzed to form a sol (a colloidal suspension of the metal hydroxide, e.g., $Mg(OH)_2$, in alcohol). A catalyst is added to the sol to induce polymerization to form a gel or wet alcogel constituting a continuous solid skeleton of the polymerized hydrolyzed material enclosing a continuous phase of the liquid alcohol.

Alternatively, a hydrogel is formed (e.g., sodium silicate, water, and sulfuric acid), worked with water to remove salts, and the water replaced with alcohol to produce an alcogel. Finally, the aerogel is formed by removing the alcohol from the pores of the gel by supercritical drying, which minimizes shrinkage and cracking.

The wet alcogel prepared in the previous step is dried by supercritical drying to maintain its original volume, thus replacing the solvent alcohol by air, while the alcohol is condensed and re-used. Conventional drying results in severe shrinkage and produces xerogels. This is due to the very high interfacial forces between the liquid and the vapor in the very small pores of the alcohol. To prevent damage to the gel structure caused by these high interfacial forces, the alcohol removal is done under supercritical conditions, where there is no distinction between the liquid and its vapor(gas). Under these conditions, the interfacial forces are eliminated. For this reason, supercritical drying in an autoclave is used to produce aerogels. Typical drying conditions for alcoholic systems are at about 270° C. and 115 bars with a heating rate ranging between about 0.5° C./min and 50° C./min, with drying time of about 3 hours. Other supercritical drying systems use liquid $CO_2$, where the alcogel is dried at 40° C. and 80 bars pressure. The parameters which effect supercritical drying including heating rate, cooling rate, type of supercritical liquid (e.g., alcohol or liquid $CO_2$), de-pressurizing rate, presence of inert gas (such as $N_2$ or Ar) and its pressure can be manipulated within the terms of the invention. After drying, the gel is flushed with dry nitrogen and heat treated in air at about 400° C. to about 600° C. to remove residual organics and to produce the final aerogel. The volume of the resulting aerogel is similar to that of the original sol which makes possible the production of monolithic aerogels as large as the autoclave.

Typically, for production of highly porous, ultralight aerogels, dilute sols should be used. The preferred aerogel composition includes CaO and MgO for gas adsorption, and either $TiO_2$ or ZnO for photocatalysis. The sol-gel preparation is conducted in a glove box using dry inert gas ($N_2$) to control humidity. The reaction temperature is also monitored and controlled. Aerogels varying in chemical and physical compositions, through manipulation of the molar ratio of the main components, type of precursors (chemical feed stock), catalyst type and concentration, are discussed herein. Both small (200 ml) and large (1500 ml) monolith and granulated aerogel specimens are included in this invention. The aerogels are manufactured through first preparing the corresponding alcogels by the sol-gel processing technology, and then by subjecting the alcogels to supercritical drying to remove the alcohol.

Several experimental techniques of preparing a preferred embodiment of an aerogel, $CaO:MgO:SiO_2$, are described below.

A first technique uses NaOH as a catalyst. (Aerogel 0910).

1. A solution of 550 ml of Methanol+56.5 gm Ca $(NO_3)_2 \cdot 4 H_2O+26.65$ gm $Mg(NO_3)_2 \cdot 6$ H2O is stirred at 60–65° C. for about 5 minutes (mins.) until dissolution.
2. 113 ml of TEOS ("tetraethylorthosilicate") is added dropwise to the solution and stirred at 60–65° C. for about 10 mins.
3. 45 ml $H_2O$ is stirred in at about 60°–65° C. for about 5 min.
4. Sodium hydroxide catalyst solution consisting of 2–4 ml NaOH (17.5M), 15–20 ml. water (distilled), and 5–200 ml methanol, is added dropwise while vigorously stirring at 60°–65° C.
5. After about 5 mins of stirring at 60°–65° C., the resulting solution is poured into a mold and gelation (a white opaque gel) occurs in a few minutes to a few hours, depending on how much catalyst solution is added.

A second technique includes using HCL+$NH_4F$ as a catalyst. This preparation includes:

1. A solution of 550 ml Methanol+56.5 gm $Ca(NO_3)_2 \cdot 4 H_2O+26.65$ gm $Mg(NO_3)_2 \cdot 6H_2O$ is stirred at 60° C. for about 5 mins.
2. 113 ml of TEOS is added during stirring at 60°–65° C. for about 10 mins.
3. 45 ml of $H_2O+6.7$ ml of concentrated HCL is added dropwise during stirring at 60° C.
4. 20 ml of $NH_4F$ solution (2.96 gm $NH_4F$ in 60 ml $H_2O$) is added dropwise during stirring at 60° C. and stirring is continued for about 15 min.
5. The resulting solution is poured into a mold and the mold is covered. Gelation occurs in several hours to form a clear and transparent gel. Gelation of a thin sheet of the solution, i.e. about 1 mm to about 10 mm thick, occurs more quickly within 1–2 hrs.

To modify the mechanical properties of this aerogel, the $SiO_2$ component may have to be replaced partially or fully, with other metal oxides such as aluminum oxide ($Al_2O_3$) and zirconium oxide ($ZrO_2$). Alternatively, to induce toughness, organic polymers may be added during the sol-gel processing. Another alternative is to sinter the aerogel at high temperatures, e.g., 750° C. or 450° C., to densify and strengthen its structure. Another alternative is to produce the aerogel as a composite with other materials or structures that induce toughness to the aerogel.

The aerogel $CaO:MgO:SiO_2$ can also be prepared at a temperature of about 260° C.–290° C. and a pressure of about 1200 psi to 2000 psi, as discussed below.

1. When a $CaO:MgO:SiO_2$ gel is prepared by a NaOH catalyst as previously described above but in a temperature range of 260° C.–290° C. and at a pressure of 1200 psi to about 2000 psi, a monolithic mold (crack free) of aerogel, results. After heat treatment at about 750° C. for several hrs., the aerogel has a white opaque color.
2. When a $CaO:MgO:SiO_2$ gel is prepared by a HCL+$NH_4F$ catalyst, as previously described above but in a temperature range of 260° C.–290° C. and at a pressure of 1200 psi to about 2000 psi, a very cracked mold of aerogels, results. After heat treatment at 750° C. for several hours, the aerogel fragments have a white opaque color.

3. CaO:MgO:Al$_2$O$_3$:SiO$_2$ gel was prepared by a HCl+NH$_4$F catalyst, as previously described above but in a temperature range of 260° C.–290° C. and at a pressure of 1200 psi to about 2000 psi, a very cracked mold like that described in 2. directly above. After heat treatment at 750° C. for several hours, white opaque aerogel fragments are formed.

Using experimental procedures, aerogel specimens within the terms of the present invention, were prepared with varying in chemical and physical compositions, through manipulation of the molar ratio of the main components, type of precursors (chemical feed stock), catalyst type and concentration, and polymer type and molecular weight, as previously described. Both small (200 ml) and large (1500 ml) monolith and granulated aerogel specimens were prepared. The aerogels were manufactured, as described before, through first the preparation of the corresponding alcogels by the sol-gel processing technology, and then by subjecting the alcogels to supercritical drying to remove the alcohol. Aerogels 1121C (small control monolith) and 1121L (large monolith) were made by drying alcogels prepared by dissolving magnesium alkoxide (0.21 M) in ethyl alcohol (15 M) and adding calcium acetate (0.79 M) and water (2.0 M) to form the sol at 60° C. Acetic acid and sodium hydroxide (0.2 M of each) were used as catalysts for polymerization and gel formation (except for aerogel 1121-C where 0.4 M NaOH was used). The alcogel for aerogel 1214 was prepared by adding calcium nitrate (0.19 M) and magnesium nitrate (0.09 M) to ethyl alcohol (8.6 M) solution of TEOS (1.0 M). These aerogels were not heat-treated.

The molar ratios of alcogels for 1121-L, 1121-C, 1214, and 0910 were as follows:

| Alcogel | Calcium Acetate | Magnesium Ethoxide | Ethanol | Water | NaOH Catalyst | Acetic Acid Catalyst |
|---|---|---|---|---|---|---|
| 1121-L | 0.79 | 0.21 | 14.78 | 2.0 | 0.23 | 0.20 |
| 1121-C | 0.79 | 0.21 | 14.78 | 2.0 | 0.40 | 0.20 |

| Alcogel | TEOS* | Magnesium Nitrate | Calcium Nitrate | Ethanol | Water | NaOH Catalyst |
|---|---|---|---|---|---|---|
| 1214 | 0.72 | 0.09 | 0.19 | 6.71 | 2.69 | 0.07 |
| 0910 | 0.595 | 0.119 | 0.286 | 11.11 | 6.92 | 0.08 |

*Tetraethyl orthosilicate (also, tetraethoxysilane).

Aerogels 1121C, 1214 and 1121L have been tested in a series of experiments discussed below. The aerogels were tested using the same procedures and the same conditions so that comparison and conclusions could be made about the different aerogels. The primary objective of these experiments was to ascertain whether the aerogel samples prepared in the laboratory could adsorb greenhouse gases, specifically, CO$_2$ and SO$_2$ gases. Heretofore, such adsorption had not been reported.

Figure 1:
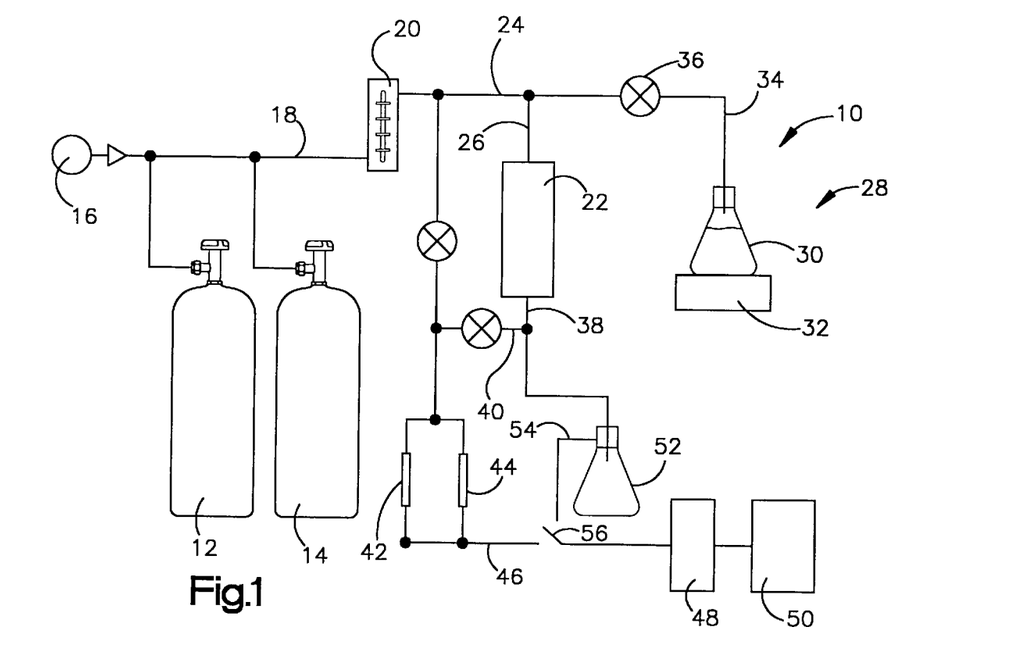
FIG. 1 is a schematic illustration of an experimental setup for adsorption of $CO_2$ and $SO_2$ from mixed gas streams.

In one adsorption test of a single gas by aerogels with the experimental test set up of FIG. 1, as described below, the gas adsorption was measured by passing the test gas (CO$_2$ or SO$_2$) over the aerogel sample enclosed in a stainless steel pressure filter vessel. The measured change in weight of the aerogel sample was an indication of the extent of gas adsorption. It was found that the presence of water vapor (steam) enhances the gas adsorption of the process as shown on Table 2. Then, humidification of the aerogel was attempted for a few minutes by applying vacuum to the pressure filter containing the aerogel, which was connected to a steam generator. After the selected time, the steam and vacuum were disconnected, and the gas cylinder was connected to the pressure filter containing the humidified aerogel. The gas was allowed to flow at 1.0 standard cubic foot per hour (SCFH) under a pressure of 10 psi for SO$_2$, and 20 psi for CO$_2$, for selected periods of time. Prior to the humidification and gas adsorption steps, the aerogel sample was evacuated for a period of time and its weight was recorded.

A second adsorption test of mixed gases by aerogels was conducted to simulate flue gas system from high sulfur coal combustion. Experimental setup 10, as shown in FIG. 1, includes cylinder 12 of SO$_2$, cylinder 14 of CO$_2$, and source of air 16 connected to line 18 which directs the gases through flow meter 20 and into stainless steel pressure filter vessel 22 containing the aerogel sample through line 24 and inlet line 26. A source of steam vapor 28, such as flask 30 filled with water seated on heater 32, produces steam vapor which can flow through line 34 having valve 36 into reaction chamber 22. Outlet line 38 from vessel 22 is connected to flask 39 with an outlet line 54 through valved line 40, to SO$_2$ detector 42, and CO$_2$ detector 44. Both detectors 42 and 44 are connected to line 46 having switch 56 to pump 48 and gas waste collector 50. Switch 56 switched between line 46 to exhaust detectors 42 and 44 or line 54 to exhaust flask 39.

During the testing procedure, SO$_2$, CO$_2$ and air from cylinders 12 and 14 and source 16 were premixed to a desired composition range, i.e., about 1000 ppm–3000 ppm SO$_2$ and 6–15.5% by volume of CO$_2$, by adjusting the valves of SO$_2$ and CO$_2$ cylinders 12 and 14. The pressure of these gases from cylinders 12 and 14 was only slightly above atmosphere (about 3 psig). Air was directly introduced from the atmosphere, that is, source 16. The gas mixing process was accomplished and the mixed gas was drawn into stainless steel pressure filter vessel 22 after passing through flow meter 20 with a fixed flow rate of 1.5 SCFH, under the vacuum pulled by pump 48. Before the gas adsorption test, water vapor (steam) from source 28 was introduced at a rate of 1.5 SCFH into reaction chamber of vessel 22 containing aerogels under a slight (near atmospheric) negative pressure for 3–5 seconds. The moisture is believed to serve as a catalyst just as it was used in testing adsorption rate by different aerogels in pure gas atmospheres, as described above. At the beginning of each gas adsorption test, the concentrations of SO$_2$ and CO$_2$ of the premixed gas were tested by Drager Gas Tubes 42 and 44 supplied by SKC, Inc. of Pennsylvania. The concentrations of SO$_2$ and CO$_2$ coming out of the adsorption chamber were also measured at different times with the Drager gas analysis detector tubes 42 and 44. The concentrations of SO$_2$ and CO$_2$ in the mixed gas stream before adsorption were again determined at the end of the test, i.e., without passing through aerogel filters first, to ensure that there was no change in the gas composition with time.

In the test for CO$_2$ and SO$_2$ adsorption of a single gas, the sample of the aerogel after each adsorption test was analyzed by using X-ray diffraction to check the phase composition. The peaks in both spectrograms showed the existence of MeSO$_3$ and MeSO$_3$ (Me refers to Ca and Mg) in adsorption-tested aerogels, which proves that these aerogels do adsorb flue gases, i.e., SO$_2$, CO$_2$, etc.

The adsorption test results also show that the gas adsorption rate can be significantly increased by the introduction of a water vapor (steam) catalyst. Some of the experimental results are listed in Table 2, which reflects the effect of water vapor catalyst on gas adsorption rate. The role of the water steam was considered to activate the gel surface, and therefore enhances chemisorption reactions on the gel surface according to the following equations:

$$CaO + H_2O \rightarrow Ca(OH)_2$$

$$Ca(OH)_{2+SO2} \rightarrow CaSO_3 + H_2O$$

$$Ca(OH)_{2+CO2} \rightarrow CaCO_3 + H_2O$$

TABLE 2

Effect of Water Vapor on Gas Adsorption
[ΔW/Wo, %] by Aerogels

| AEROGEL | 1121C | | 1121L | | 1214 | |
|---|---|---|---|---|---|---|
| $H_2O$ Vapor | No | Yes | No | Yes | No | Yes |
| CO2 | NA | 17.42 | 0.714 | 3.270 | NA | 3.80 |
| SO2 | NA | 24.60 | 10.94 | 57.23 | NA | 104.85 |

\* ΔW = net weight change due to gas adsorption only
Wo = initial aerogel sample weight after evacuation The results of the gas adsorption tests for three aerogel specimens and two gases ($CO_2$, $SO_2$) are shown on Tables 3–8.

TABLE 3

Adsorption Results of $SO_2$ by Aerogel 1121C

| Time (min) | ΔW (g) | ΔW/Wo (%) | Remarks |
|---|---|---|---|
| 3 | 4.05 | 18.08 | Initial sample weight = 22.4 g |
| 6 | 5.80 | 25.89 | Initial temperature = 25° C. |
| 10 | 6.55 | 29.24 | Water vapor adsorbed = 7.75 g, i.e., 34.44% |
| 15 | 6.90 | 30.80 | Temperature increases to about 80° C. after water introduction |
| 25 | 7.55 | 33.71 | |
| 40 | 7.75 | 34.60 | |

TABLE 4

Adsorption Results of $CO_2$ by Aerogel 1121C

| Time (min) | ΔW (g) | ΔW/Wo (%) | Remarks |
|---|---|---|---|
| 3 | 2.20 | 9.95 | Initial sample weight = 22.1 g |
| 6 | 2.95 | 13.35 | Initial temperature = 25° C. |
| 10 | 3.65 | 16.52 | Water vapor adsorbed = 10.95 g, i.e., 49.55% |
| 15 | 3.75 | 16.87 | Temperature increases to about 70° C. after water introduction |
| 30 | 3.85 | 17.42 | |

TABLE 5

Adsorption Results of $SO_2$ by Aerogel 1214

| Time (min) | ΔW (g) | ΔW/Wo (%) | Remarks |
|---|---|---|---|
| 3 | 13.20 | 98.51 | Initial sample weight = 13.4 g |
| 6 | 13.45 | 100.33 | Initial temperature = 25° C. |
| 10 | 13.45 | 100.37 | Water vapor adsorbed = 8.1 g, i.e., 60.45% |
| 15 | 13.85 | 103.36 | Temperature increases to about 75° C. after water introduction |
| 25 | 14.05 | 104.85 | |

TABLE 6

Adsorption Results of $CO_2$ by Aerogel 1214

| Time (min) | ΔW (g) | ΔW/Wo (%) | Remarks |
|---|---|---|---|
| 3 | 0.50 | 3.80 | Initial sample weight = 16.25 g |
| 8 | 0.50 | 3.80 | Initial temperature = 25° C. |
| 20 | 0.43 | 2.48 | Water vapor adsorbed = 10.8 g, i.e., 66.46% |

It can be seen that $SO_2$ gas adsorbs readily with all three aerogel sorbents. The reaction is always exothermic and the temperatures of the adsorption reactor rises significantly during the adsorption process. Aerogel 1121L is similar to 1121C in composition, but it did not adsorb $CO_2$ gas as well. The XRD spectrograms revealed that this 1121L aerogel already contained $CaCO_3$, and thus it was unable to adsorb and react with more $CO_2$ gas. Aerogel 1121L was stored in an open container. Thus it must have already reacted with atmospheric $CO_2$ during the storage period. Aerogel 1121C, on the other hand, was stored in a closed container. Thus it did not react with atmospheric $CO_2$ to the same degree as 1121L, and as a result it was able to adsorb $CO_2$. All aerogel samples show the presence of calcium or magnesium sulfites as reaction products of $SO_2$ gas adsorption.

TABLE 7

Adsorption Results of $SO_2$ by Aerogel 1121L

| Time (min) | ΔW (g) | ΔW/Wo (%) | Remarks |
|---|---|---|---|
| 3 | 5.10 | 32.08 | Initial sample weight = 15.9 g |
| 6 | 7.35 | 46.23 | Initial temperature = 25° C. |
| 10 | 8.40 | 52.83 | Water vapor adsorbed = 6.27 g, i.e., 39.43% |
| 15 | 8.65 | 54.40 | |
| 25 | 9.10 | 57.23 | |

TABLE 8

Adsorption Results of $CO_2$ by Aerogel 1121L

| Time (min) | ΔW (g) | ΔW/Wo (%) | Remarks |
|---|---|---|---|
| 3 | 0.35 | 2.12 | Initial sample weight = 16.5 g |
| 6 | 0.54 | 3.27 | Initial temperature = 25° C. |
| 10 | 0.51 | 3.09 | Water vapor adsorbed = 14.75 g, i.e., 89.39% |
| 25 | 0.50 | 3.03 | |

Of special note is Aerogel 1214 which adsorbed about 105% of its weight of $SO_2$ gas, in addition to about 60.5% of its weight of $H_2O$ vapor, i.e., 165.50% adsorption capacity. However, $CO_2$ adsorption was not favorable. This is believed to be due to the adsorption of atmospheric $CO_2$ during the open storage of this gel as was the case with Aerogel 1121L.

Several conclusions can be drawn from these experimental results. First, aerogels can adsorb $CO_2$ and $SO_2$ gases. Second, by controlling the chemical composition, porosity, and pore sizes of aerogels, and parameters of the adsorption process, capture of these gases can be further improved. Third, the capture of other gases such as $NO_x$, CO, $CH_4$, $H_2S$, by aerogels should be feasible.

In the experiment for $CO_2$ and $SO_2$ adsorption by aerogels from mixed gas streams, the results were obtained through measuring the gas concentration of the mixed as before and after the adsorption test. Table 9 shows the $SO_2$ and $CO_2$ adsorption with time by Aerogels 1121C, 1121L, and 1214, respectively, for a range of $SO_2$ and $CO_2$ initial concentrations.

TABLE 9

Percent/Adsorption/Capture of $SO_2$ and $CO_2$ from mixtures with air by Aerogels 1121-L, 1121-C, and 1214.

| | Aerogel Type | | | | | |
|---|---|---|---|---|---|---|
| | 1121-L | | 1121-C | | 1124 | |
| | $SO_2$ | $CO_2$ | $SO_2$ | $CO_2$ | $SO_2$ | $CO_2$ |
| | | | Inlet Level | | | |
| Adsorption Time (min) | 2200 ppm | 12.5 vol-% | 1800 ppm | 15.5 vol-% | 3000 ppm | 12 vol-% |
| 5 | 100 | 100 | 100 | 100 | 98 | 100 |
| 10 | 100 | 100 | 100 | 98.4 | 94 | 100 |
| 15 | 98 | 100 | 100 | 100 | 90 | 99 |
| 20 | 98 | 99 | 100 | 99 | 88.7 | 99.3 |

TABLE 9-continued

Percent/Adsorption/Capture of $SO_2$ and $CO_2$ from mixtures with air by Aerogels 1121-L, 1121-C, and 1214.

| | Aerogel Type | | | | | |
|---|---|---|---|---|---|---|
| | 1121-L | | 1121-C | | 1124 | |
| | $SO_2$ | $CO_2$ | $SO_2$ | $CO_2$ | $SO_2$ | $CO_2$ |
| | | | Inlet Level | | | |
| Adsorption | 2200 | 12.5 | 1800 | 15.5 | 3000 | 12 |
| Time (min) | ppm | vol-% | ppm | vol-% | ppm | vol-% |
| 25 | — | — | — | — | — | 99.3 |
| 30 | 97 | 97 | 91.7 | 98.4 | 90 | 99.3 |
| 40 | — | — | — | — | 95 | 98.3 |
| 45 | 98 | 96 | 94.5 | 98.4 | — | — |
| 50 | — | — | — | — | 90 | 98 |
| 60 | 96 | 94 | 95.6 | 99 | 83 | 96 |

The results shown in Table 9 showed that the concentrations of both $SO_2$ and $CO_2$ decreased greatly after contacting the aerogel sorbents, i.e., all three aerogels were very effective in the capture of $SO_2$ and $CO_2$ from flue gases. Also, Table 9 indicates that $CO_2$ was more effectively adsorbed than $SO_2$ by Aerogels 1121C and 1214 while the opposite was true for Aerogel 1121L. This might be due to the long exposure time with atmosphere whereby this gel has already adsorbed $CO_2$ on the surface to a large extent so that during the test, this gel adsorbs relatively small amount of $CO_2$. Moreover, Table 9 shows that over 95% of $CO_2$ was adsorbed by Aerogels 1121C and 1214, and 85–90% by Aerogel 1121L. Also, $SO_2$ gas removal was significant and range between 85–100%.

Based on the experimental results for mixed gas adsorption, as disclosed, the following conclusions can be drawn. First, all three Aerogels 1121C, 1121L, and 1214, can effectively adsorb $CO_2$ and $SO_2$ from flue gases and $CO_2$ gas is more readily adsorbed by gels than $SO_2$ gas. Second, over 95% of $CO_2$ gas and between 85–100% of $SO_2$ gas in simulated flue gas can be removed by using aerogels. Additionally, Aerogel 0910 which has a similar chemical composition as Aerogel 1214 except that it is heat treated, adsorbs well gases and VOC's (such as CO, NO, $H_2S$, benzene, formaldehyde, acetone, methylene chloride, and toluene, each from mixture with air, using the same experimental procedure for $SO_2$ and $CO_2$ from air mixtures. The results of these tests are shown in Tables 10 and 11 for gases and VOC's, respectively.

TABLE 10

Percent adsorption/capture of gases from mixtures with air by Aerogel 0910

| Gas Type Inlet Level Adsorption time (min) | NO 1200 ppm | CO 992 ppm | $H_2S$ 230 ppm |
|---|---|---|---|
| 5 | 100 | — | 90 |
| 10 | 100 | 92.6 | — |
| 15 | 100 | — | 83 |
| 20 | 100 | — | — |
| 30 | 100 | 96.3 | 65 |
| 45 | 100 | 96.3 | 48 |
| 60 | — | — | 48 |
| 75 | 99.1 | 94.4 | 48 |
| 90 | 99.0 | — | 48 |
| 105 | 99.4 | 96.3 | 39 |
| 120 | 99.0 | 94.4 | — |
| 135 | 98.8 | 92.6 | — |
| 150 | 98.3 | 94.4 | — |

TABLE 11

Percent adsorption of VOC's from mixtures with air by Aerogel 0910

| VOC Type Inlet Level Adsorption Time (min) | Benzene 420 ppm | Toluene* 532 ppm | Acetone* 6000 ppm | Methylene Chloride* 2000 ppm | Formaldehyde 40 ppm |
|---|---|---|---|---|---|
| 5 | 96.5 | 100 | 100 | 97.5 | — |
| 15 | — | 100 | 100 | 97.5 | 100 |
| 20 | 96.5 | — | — | — | — |
| 45 | — | 100 | 98 | 97.5 | 100 |
| 50 | 97.6 | — | — | — | — |
| 75 | — | 92.3 | — | 95 | 95.5 |
| 105 | — | 90 | 98 | 95 | 95.5 |
| 110 | 95.2 | — | — | — | — |
| 135 | 92.9 | 90 | 98 | 96 | 87.5 |
| 150 | 88.1 | 90 | 98 | 95 | 80.0 |

*Combined mixture in an industrial solvent. The whole solvent which also contains methanol, is mixed with air intake.

The aerogel adsorbents set forth in Table 12, below, were made by sol-gel and supercritical drying, except adsorbents CRF 200 and CRF 400 which were prepared by carbonizing resorcinol-formaldehyde (RF) aerogels (i.e., pyrolyzing the RF aerogel in an inert atmosphere at 1050° C.). The apparent density of aerogel adsorbents and catalysts can vary between 0.04 to 1.0 g/cm3.

TABLE 12

| | | BET | Loading (wt-% @ 50° C.) | |
|---|---|---|---|---|
| Adsorbent | Composition | Surface Area | Toluene | Cyclohexanone |
| ST-31 | $SiO_2:TiO_2$ (3:1) | 691 | 12 | 27 |
| ST-21 | $SiO_2:TiO_2$ (2:1) | 767 | 10 | — |
| ST-11 | $SiO_2:TiO_2$ (1:1) | 548–552 | 6 | — |
| SAM | $SiO_2:Al_2O_3:MgO$ | 262 | 2 | |
| CZM | $CaO:ZrO_2:MgO$ | 124 | 3 | |
| ZT | $ZrO_2:TiO_2$ | 252 | 5 | |
| CRF-200 | Resorcinol:Formaldehyde | 659 | 16 | |
| CRF-400 | Resorcinol:Formaldehyde | 659 | 17 | 16 |

It was possible to obtain between 70–100% de-sorption of VOC's by pure air at 50° C. Thus, the above-tabulated aerogels are regenerable (i.e., these aerogels can undergo adsorption-desorption cycles) for solvent recovery after adsorption from air.

Although all aerogels are capable of some adsorption of gases and vapors, the preferred aerogel adsorbent will have active aerogel adsorbent components capable of a strong adsorption of the gas or vapor in question, uniformly dispersed in a relatively inert aerogel matrix which does not strongly (or not at all) adsorb the gas or vapors in question. For example, adsorption of $SO_2$, $NO_X$, $CO_2$, CO, and $H_2S$ is best accomplished by an aerogel containing adsorption aerogel sites, such as, MgO and CaO dispersed in $SiO_2$ aerogel matrix, as shown in test results set forth herein. The advantage of having active sites in an inert matrix, is that adsorption products (e.g., $CaSO_4$ solids in $SO_2$ gas adsorption from a mixture with air) attached to an active site, do not physically block other active sites from further adsorption. The preferred content of active aerogel sites in an aerogel matrix for the practical applications in the scope of air pollution control is between about 20%–80% molar weight. Support for the advantage of having active adsorption sites dispersed in an inert matrix can be found in the adsorption results as follows:

$SO_2$ Adsorption: Tables 3, 5, and 7, show $SO_2$ adsorption capacity for aerogels 1121-C, 1214, and 1121-L, as 34.60 wt-%, 104.85 wt-%, and 57.23 wt-%, respectively. While the Ca+Mg adsorption sites for $SO_2$ constitute about 100% molar weight of aerogels 1121-C, and 1121-L, these sites constitute only 28% molar weight of aerogel 1214, while the balance, 72%, is inert silica sites (i.e., non-reactive with $SO_2$ at adsorption conditions). The distinctly higher adsorption capacity by aerogel 1214 (approx. 105 wt. % $SO_2$ by 28 wt. % CaO+MgO, or molar ratio of S:(Ca+Mg)=3.75:1) compared with aerogels 1121-C and 1121-L (35%–57% by wt., or a molar ratio of S:(Ca+Mg)=0.35–0.57:1), points to the advantage of having the active adsorption sites dispersed in an inert matrix as mentioned above.

This increased adsorption is not attributed to an increase in surface area of aerogel 1214 for the following reason. The porosity and surface area of an aerogel is largely controlled by the molar ratio of alcohol (or water in case of hydrogel) to precursor in the sol-gel preparation of wet alcogel. The molar ratio of ethyl alcohol to precursors in alcogel 1214 is 6.71, which increases to 9.40 after hydrolysis; while this ratio is 14.78 for alcogels 1121-C & 1121-L, which together with other hydrolysis products could reach 16.78. Thus, the surface area of aerogel 1214 is likely to be less than that for aerogel 1121-C and 1121-L. Alcogels for 1121-C & 1121-L are identical except that the NaOH catalyst molar ratio for 1121-C is 0.4, compared to 0.23 for 1121-L.

VOC adsoption: Tests on adsorption of toluene vapors in air at 50° C. by silica-titania aerogels showed that adsorption capacity of these aerogels is related to the molar ratio of silica to titania. For example, a silica:titania ratio of 3:1 (surface area=691 $m^2$/g) showed adsorption of 12 wt. % of toluene, while molar ratios of 2:1 (surface area=767 $m^2$/g), and 1:1 (surface area=550 $m^2$/g), showed adsorption of 10 wt. %, and 6 wt. %, respectively. Once again, this increase in adsorption with the lower titania content is not related to surface area, but points to the advantage of having active adsorption sites (e.g., $TiO_2$) dispersed in a relatively inert matrix such as silica. Titania is known for its adsorption of organic compounds (see, D. F. Ollis, E. Pelizzetti, and N. Serpone, "Heterogeneous Photocatalysis in the Environment: Application to Water Purification", *Photocatalysis Fundamentals and Applications*, Eds.: N. Serpone & E. Pelizzetti, Wiley 1989, for titania powder and granules; and Dagan & Tomkiewicz cited above, for titania aerogel).

Figure 2:
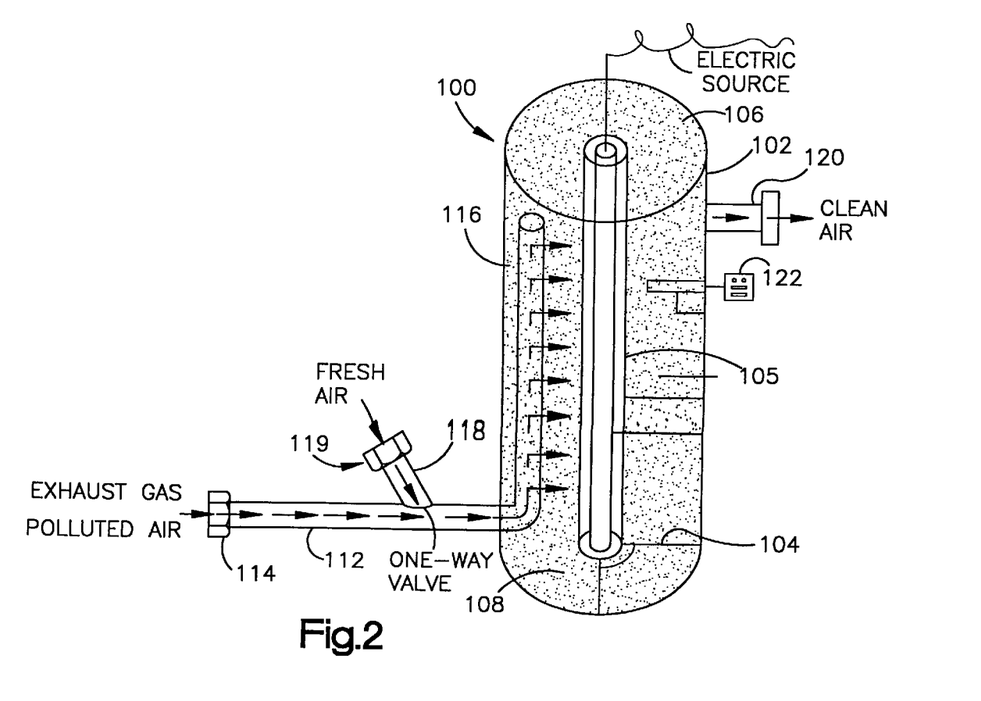
FIG. 2 is a schematic illustration of an emission control cell.

Another aspect of the invention relates to the design and use of emission control cell 100 incorporating photocatalytic aerogel adsorbents. "Photocatalysis" for present purposes encompasses the redox (reduction in the absence of oxygen and oxidation in the presence of oxygen) reaction of a contaminant absorbed by the aerogel, which preferably is of a suitable composition, as elaborated earlier herein. Emission control cell 100, as shown in FIG. 2, features on-stream photocatalytic conversion of VOC's (such as, for example, benzene, toluene, acetone, methylene chloride, and formaldehyde) to $CO_2$, $H_2O$ and HCl and simultaneous adsorption/conversion of $NO_X$, $SO_2$, and CO gases from emission sources. Emission control cell 100 is constructed of a hollow cylindrical casing 102 which houses photocatalytic aerogel adsorbents such as CaO:MgO:$TiO_2$:$SiO_2$ where the $TiO_2$ photocatalytic component may be replaced with other photocatalytic components such as for example ZnO, $WO_3$, $Fe_2O_3$, $SrTiO_3$, and $Bi_2O_3$ and includes opening 104 at the lower end for inserting replacement aerogel adsorbents as needed. Glass jacket 105 is disposed vertically through the center of cylinder 102 and extends from one end 106 to the other end 108. A fluorescent black light bulb or optical fibers connected to a black light source are disposed within glass jacket 105. Alternatively, natural sunlight could be used by exposing the apparatus to natural daylight.

Inlet line 112 having particulate filter 114 therein directs exhaust gas and/or polluted air into air distributor 116 which extends through cylinder 102 in, spaced, parallel relation to jacket 105. Line 112 includes fresh air inlet 118 with particulate filter 119 and a one way valve (not shown) which enables fresh air to be mixed with the exhaust gas and/or polluted air flowing through line 112prior to entering cell 100. Exhaust outlet 120 is provided to exhaust clean air from cell 100. Sensor and indicator device 122 is mounted to cylinder 102 for monitoring the conditions of the aerogel and indicate when replacement is necessary.

In operation, fresh air is drawn through line 118 into line 112 by the flow of exhaust gases into cylinder 102. The fresh air is necessary for efficient photo-oxidation of VOC's. The mixture of exhaust gas and fresh air is directed into distributor 116 so that it is uniformly emitted into the aerogel surrounding glass jacket 105 containing the black light. A discussion of photocatalysis is found in the article entitled "Mixed Reactant Photocatalysis: Intermediates and Mutual Rate Inhibition" by Turchi and Ollis, *Journal of Catalysis*, 119, 483–497 (1989). In accordance with the invention, the geometrical and dimensional aspects of cell 100 are determined to suit desired gas flow-rates and emission control efficiencies. A blower or vacuum pump may be connected to the gas inlet or the outlet, to cause effect fast flow, if existing gas flow is not strong enough.

The following discussion is set forth to aid in a better understanding of the present invention, but it should not be considered as limiting the present invention. The mechanism of photocatalysis by an aerogel containing photoactive semiconductor aerogels, such as $TiO_2$, ZnO, etc., is considered to be through the formation of a free radical at the surface of the semi-conductor. This free radical can move back into the main gas (fluid) stream, thus triggering a chain of reactions with fresh molecules before being finally destroyed. In contrast with other catalysis mechanisms which consider the reaction to occur at or in the vicinity of the surface, this mechanism views the catalyst surface as a generator of free radicals, with the reaction occurring in the main body of the gas (fluid).

Illumination of wide bandgap semiconducting materials, such as $TiO_2$ and ZnO, produce electrons and holes at the semiconductor surface. These species can be used for photocatalysis oxidation and reduction. For example, in the presence of water vapor or liquid, the free radical hydroxyl group, $OH^-$, is formed, which in the presence of oxygen rapidly oxidizes organic molecules, such as cyanide and benzene as follows:

$$TiO_2 + 2h\nu = TiO_2(2h^+ + 2e^-)$$

$$0.5O_2 + 2e^- + H_2O = 2OH-$$

$$2OH^- + 2h^+ = 2OH\cdot \text{ (free radical group)}$$

a) Cyanide $CN^-$:

b) Benzene, $C_6H_6$:

Radical groups of reacting molecules (through adsorption or collision with semiconductor surface) also form such as $CO_3\cdot$ or $CO_2\cdot$ on $TiO_2$. in the photoreduction of carbon dioxide, and $CH_3\cdot$ and $CH_3COOH\cdot$ in the photo-Kolbe reactions.

From the above mechanism, the overall rate of reaction (photocatalysis kinetics) can be seen to be a function of the rate of collision between the reacting molecules and semiconductor surface to form free radicals, and the rate of collision between the free radicals and fresh reacting molecules. These rates of collisions can be improved by either an increase of adsorption of reacting molecules on the semiconductor surface where it is easier for a free radical to form and to react with neighboring gas/fluid molecules; or by achieving a good dispersion (perfect mixing) of reacting gas (fluid) with the semiconductor surface. Thus, adsorption speeds up the catalytic reaction significantly and is, therefore, highly desirable. But the same results can be achieved by good mixing. On the other hand, in the case of strong adsorption, if reaction products are slow to desorb from photoactive sites, deterioration of the kinetics, or even inhibition of photocatalysis, will take place. Thus, strong adsorption also could be detrimental to photocatalysis.

From the foregoing discussion, it is not obvious that the use of silica-titania aerogel for photocatalysis can teach the design and use of aerogels as adsorbents.

Furthermore, even in other catalytic reactions where adsorption of the gas onto the solid catalyst is considered to be a pre-condition for catalysis, such adsorption does not automatically teach that the inventive catalyst is also a good commercial adsorbent for the same gas.

For example, Alvin B. Stiles and Charles C. Hong (U.S. Pat. No. 5,362,463), teach that a 50/50 mixture of manganese and aluminum oxides covered with potassium carbonate, can be used as a adsorbent-catalyst for $NO_X$ gases from air under a reducing atmosphere of 0.05–10% hydrogen in nitrogen at 300° C. The Stiles and Hong patent also indicates that this adsorbent-catalyst had a loading (adsorption capacity) of 0.2% $NO_X$ by weight of catalyst. While such a very low adsorption capacity (loading) can be tolerated for a catalyst as the adsorbed gas molecules are rapidly reduced and replaced with fresh gas molecules, this low loading, 0.2 wt. %, is not likely to be tolerated if the catalyst is to be used solely as an adsorbent. Usually, good commercial adsorbents have between 5 and 50 wt. % loading, and more typically for VOC's 20–30 wt. %. If these loading numbers are not met, the adsorption process becomes commercially uneconomical. Thus, following the teaching of Stiles and Hong patent does not lead to or make it obvious that a good catalyst makes a good economic adsorbent for the scope of air pollution control addressed herein.

The invention further includes the composition and preparation of mixed metal oxide aerogels, such as $CaO:MgO:TiO_2:SiO_2$, for combined adsorption and photocatalysis. An example of the preparation of $TiO_2:SiO_2$, and $CaO:MgO:TiO_2:SiO_2$ aerogels follows:

1. A solution of 75 ml TEOS and about 200 ml. ethyl alcohol is stirred at about 55–60° C. in a reflux system for about 10 minutes.
2. About 7 ml of $H_2O$ and a few drops of $HNO_3$ are added to the reflux system and stirred for about 2 hrs.
3. After about 2 hrs, when the reflux system is cooled to room temperature about 25 ml of $Ti(OC_3H_7)_4$ is added.
4. After about 5 minutes, about 25 ml. of $H_2O$ is added to the solution and stirred at room temperature for about 15 minutes.
5. The solution is then poured into molds.
6. Gelation occurs after about 48 hours at room temperature. However, faster gelation results when less alcohol is used and when the ratio of Ti to Si increased to 75:25 by weight. At this ratio and using 75 ml ethyl alcohol, instead of 200 ml, instant gelation took place.
7. As previously described, the resulting $TiO_2:SiO_2$ aerogel can be subjected to supercritical drying, heat treatment and ground to the desired shape, as necessary.
8. For preparation of $CaO:TiO_2:MgO:SiO_2$, calcium nitrate, and magnesium nitrate are added and dissolved in Step 1 of this procedure.

The results of photocatalysis of benzene in water using $TiO_2:SiO_2$ at a 50:50 ratio by weight, in the presence of blue-black light (ultraviolet light) are shown in Table 12. The results show the remarkable degradation of benzene by this process.

TABLE 13

Photocatalytic degradation of benzene from water by $TiO_2:SiO$ (TS11) Aerogel

| Catalysis Time (min) | Control No Catalyst Benzene Level (ppm) | Aerogel TS11 Benzene Level (ppm) |
|---|---|---|
| 15 | 2641 | 0.9 |
| 30 | 2241 | 0.04 |
| 60 | 536 | 0.02 |

While cell 100 is illustrated with a black light, it is also within the scope of the invention to delete the black light and provide in-situ adsorption of emission gases and VOC's followed by off-site photocatalytic of thermal oxidation of VOC's A particular advantage of emission control cell 100 is the simplicity of design, operation, maintenance and reliability. For example, the aerogel sorbent can be easily replaced through opening 104.

While various methods are described for preparing the aerogels of the present invention are described, it is within the terms of the invention to prepare them by other methods.

While aerogels have been described for gas or vapor capture and/or separation for environmental and health applications, it is also within the scope of the invention to use aerogels for gas or vapor capture and/or separations pertaining to:

a) upgrading of natural gas, i.e. separation of $CO_2$ from $CH_4$ to produce higher grade (higher value) natural gas;

b) separation of $CO_2$ from $H_2$ hydrogen to produce higher grade hydrogen fuel from fermentation plants;

c) separation of gases from mixtures to produce high grade industrial gaseous products using aerogel as a gas chromatography column: and d) gas chromatography columns containing aerogel, for separating vapors and gases for analysis.

To achieve selective gas separation, design and control of the aerogel's chemical composition, pore size and pore shape, and overall porosity (volume %) can be made to suite the particular separation system (i.e., types of gases to be separated).

While various VOC's have been set forth, it is also within the terms of the present invention to separate and/or capture any other type of VOC such as, but not limited to: benzene and benzene derivatives including haloaromatics; carboxylic acids and derivatives; aldehydes and ketones and their derivatives; alcohols, esters and derivatives; amines and mercaptans; alkanes, alkenes and halogenated derivatives; alicyclic compounds and derivatives; and ethers and vinyl compounds. Still other VOC's found in gas streams which can be treated by catalytic converters in accordance with the invention are $C_2$–$C_5$ olefins, pseudocumens, $C_9H_{12}$, $CH_4$ (methane), diamine, benzene, $CH_3CHO$ (acetaldehyde), HCHO (formaldehyde), $CH_3OH$ (methyl alcohol), dioctyl phthalate, dibutyl and diheptyl phthalate, $CH_3SH$ (mercaptan), mineral oil, vapor from printing, phenol, thiophene, $C_3H_5$, halomethanes, $C_2H_4$, ethyl alcohol, cyclohexane, cyclohexene, acetic acid, formic acid, volatile urine compounds, butanol, octomethyl cyclotetrasiloxane, dodecamethyl pentasiloxane, decamethylcyclopentasiloxane, tributyl phosphate, $CH_2H_2Cl_2$, toluene, naphthalene, anthracene, propylacetate, methyl ethyl ketones, ethyl acrylate, methylmethacrylate, n-butyl acrylate, styrene, dichloroethane, butyric acid, butyraldehyde, n-propylamine, acrolin, butanal, xylene, ammonia, cyanogen, halides chlorine, iodine, bromine, fluorine; carbon disulfide, arsenic hydride (arsine), hydrogen phosphide, hydrogen (bromide, iodide, fluoride, chloride, sulfide), mercury, nitrosyl chloride, n-nonane (vapor), n-octane (vapor), hydrogen cyanide, hydrogen deuteride, tritium, radon, military toxic gases, acetone, benzene, carbon monoxide, chloroform, ethyl alcohol, ether, helium, hydrochloric acid, hydrogen, methane, methyl alcohol, methyl ether, nitric oxide, nitrogen, nitrous oxide, pentane, sulfur dioxide, boron tribromide, boron trichloride, boron trifluoride, carbonyl sulfide, deuterium, germanium tetrachloride, hydrazine, phosphine, silane, and stannic chloride.

While not intending to limit the scope of the invention, it is also within the terms of the present invention to separate and/or capture any other type of gases such as but not limited to the following partial list of haloaromatics which are degradable by photocatalysis in accordance with the invention. These include chlorophenol, dichlorophenol, pentachlorophenol, trichlorobenzene, trichloro-phenol, sodium pentachlorophenate, chlorobenzene, trichlorophenoxyacetic acid, dichlorodiphenyl trichloroethane, dichlorobiphenyl, dichlorodibenze-p-dioxin. In addition, a partial list of degradable haloalkanes, alkanes and carboxylic acids degradable by photocatalysis in accordance with the invention are methylene chloride, chloroform, ethylene dichloride, vinyl chloride, trichloroethylene, perchloroethylene, monochloroacetic acid, dichloroacetic acid, phosgene, dibromomethane, vinyl bromide, bromoform (tribromomethane), ethylene dibromide, and carbon tetrachloride.

The references listed herein are expressly incorporated by reference in their entireties.

It is apparent that there has been provided in accordance with this invention apparatus and methods for capturing, separating particulate free gases, vapors and VOC's from gaseous mixtures with novel aerogels that satisfy the objects, means and advantages set forth hereinbefore. According to the invention, the composition and method of producing novel aerogels having a high surface area, a very high porosity, and a very low density are disclosed. In addition, an emission control cell is disclosed for photocatalytic conversions of volatile organic compounds and simultaneous adsorption and/or conversion of greenhouse gases from gaseous effluents.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

I claim:

1. In a method for separating a vaporous or gaseous discharged pollutant with an adsorbent from an air stream contaminated therewith, the improvement which comprises the steps of:

(a) passing said contaminated air into a contact zone in which is disposed said adsorbent which consists essentially of an aerogel material capable of selectively adsorbing said pollutant from air and therein contacting said contaminated air with an aerogel material; and (b) withdrawing from said zone, an air stream depleted of said pollutant.

2. The method of claim 1, wherein said aerogel material contains a metal oxide.

3. The method of claim 2, wherein said aerogel material has between a 50–99% porosity, a density in the range of about 0.04 g/cc to about 1.0 g/cc, and a surface area of about 20 $m^2$/g–1600 $m^2$/g.

4. The method of claim 3, wherein said aerogel material has a composition of CaO and MgO.

5. The method of claim 3, wherein said aerogel material has a composition of CaO, MgO, and $SiO_2$.

6. The method of claim 3, wherein said aerogel material has a composition of CaO, MgO, $SiO_2$, and $TiO_2$.

7. The method of claim 2, wherein said metal oxide is one or more of CaO, $TiO_2$, MgO, $Al_2O_3$, or $ZrO_2$.

8. The method of claim 2, wherein said metal oxide-containing aerogel material is dispersed in an aerogel matrix inert to said contaminant in a concentration of from between about 20% and 80% by molar percentage.

9. The method of claim 2, wherein said aerogel material additionally contains organic or carbonized organic material.

10. The method of claim 5, wherein said pollutant is one or more of $NO_x$, $H_2S$, $SO_2$, CO, $CO_2$, HCl, HF, benzene, toluene, acetone, methylene chloride, or formaldehyde.

11. The method of claim 1, wherein said aerogel materi al is a composite aerogel material comprising a mixture of active aerogel material capable of selectively adsorbing said pollutant and inert aerogel material incapable of selectively adsorbing said pollutant.

12. A process of photocatalytic destruction of volatile organic contaminants (VOCs) from a gas stream contaminated therewith, comprising the steps of;
   (a) passing said contaminated gas into a control cell in which is disposed a photocatalytic aerogel material and therein contacting said contaminated gas with an aerogel material, wherein said photocatalytic aerogel material is a composite aerogel material comprising a mixture of active photocatalytic aerogel material and inert aerogel material incapable of selectively photocatalyzing said VOCs and transparent to UV radiation;
   (b) exposing said photocatalytic aerogel material containing said adsorbed VOCs to ultraviolet (UV) radiation for their destruction; and
   (c) withdrawing from said zone, a gas stream depleted of said VOCs.

13. The method of claim 12, wherein said active photocatalytic aerogel material is one or more of $TiO_2$, $ZnO$, $WO_3$, $Fe_2O_3$, $SrTiO_3$, $RuO_2$, $MoS_2$, or $Bi_2O_3$.

14. The method of claim 13, wherein said inert aerogel material comprises silica.

15. The method of claim 13, wherein said active photocatalytic aerogel material is present in a molar percentage of between about 20% and 80%.

16. The method of claim 14, where in said active photocatalytic aerogel material is titania in a molar percentage of between about 20% and 80%.

17. The process of claim 12, wherein said photocatalytic aerogel material is $Cao$, $MgO$, $SiO_2$, and $TiO_2$.

18. The process of claim 12, including the step of mixing ambient air with said contaminated gas stream to form the gas stream passing to said control cell.

19. The process of claim 12, wherein said control cell is substantially depleted in oxygen content during step (a).

* * * * *